(12) United States Patent
Kim et al.

(10) Patent No.: US 11,709,890 B2
(45) Date of Patent: Jul. 25, 2023

(54) METHOD FOR SEARCHING VIDEO AND EQUIPMENT WITH VIDEO SEARCH FUNCTION

(71) Applicant: LG ELECTRONICS INC., Seoul (KR)

(72) Inventors: Young Han Kim, Yongin-si (KR); Sang Hyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 16/805,578

(22) Filed: Feb. 28, 2020

(65) Prior Publication Data

US 2021/0064882 A1    Mar. 4, 2021

(30) Foreign Application Priority Data

Aug. 27, 2019  (KR) .......................... 10-2019-0105256

(51) Int. Cl.

| | |
|---|---|
| *G06F 16/783* | (2019.01) |
| *G06F 16/71* | (2019.01) |
| *G06F 16/78* | (2019.01) |
| *G06V 20/40* | (2022.01) |
| *G06F 18/22* | (2023.01) |
| *G06F 18/21* | (2023.01) |
| *G06N 3/08* | (2023.01) |
| *G06N 3/04* | (2023.01) |
| *G06N 20/10* | (2019.01) |

(52) U.S. Cl.
CPC ............ *G06F 16/783* (2019.01); *G06F 16/71* (2019.01); *G06F 16/7837* (2019.01); *G06F 16/7867* (2019.01); *G06F 18/2178* (2023.01); *G06F 18/22* (2023.01); *G06N 3/04* (2013.01); *G06N 3/08* (2013.01); *G06V 20/48* (2022.01); *G06V 20/49* (2022.01); *G06N 20/10* (2019.01)

(58) Field of Classification Search
CPC ............ G06K 9/00758; G06K 9/6201; G06K 9/6263; G06K 9/00765; G06K 9/00711; G06K 9/00744; G06F 16/71; G06F 16/7837; G06F 16/7867; G06F 16/783; G06N 3/04; G06N 3/08; G06N 20/10; G06N 3/0454; G06N 3/02; G06Q 50/20; G10L 15/22
USPC ......................................................... 382/159
See application file for complete search history.

(56) References Cited

U.S. PATENT DOCUMENTS

| | | | |
|---|---|---|---|
| 2008/0180525 A1* | 7/2008 | Kanehira | G06V 10/24 348/E7.086 |
| 2012/0176364 A1* | 7/2012 | Schardt | G06T 15/405 345/419 |
| 2015/0100578 A1* | 4/2015 | Rosen | G06Q 10/1093 707/737 |

FOREIGN PATENT DOCUMENTS

| | | | | |
|---|---|---|---|---|
| KR | 1020100055924 | | 5/2015 | |
| KR | 101783872 | | 10/2017 | |
| WO | WO-2010019024 A2 * | | 2/2010 | G06T 7/12 |

* cited by examiner

*Primary Examiner* — Amandeep Saini
(74) *Attorney, Agent, or Firm* — Lee, Hong, Degerman, Kang & Waimey PC

(57) ABSTRACT

A method for searching a video and equipment with a video search function are provided. The method for searching a video includes constructing a video DB by analyzing continuity of a tag given to an appearing object and extracting section information about the tag, and detecting video information. An object may be recognized, a video database may (Continued)

be constructed, and a video may be searched on the basis of analysis based on an artificial intelligence (AI) model through a 5G network.

16 Claims, 13 Drawing Sheets

[FIG. 1]
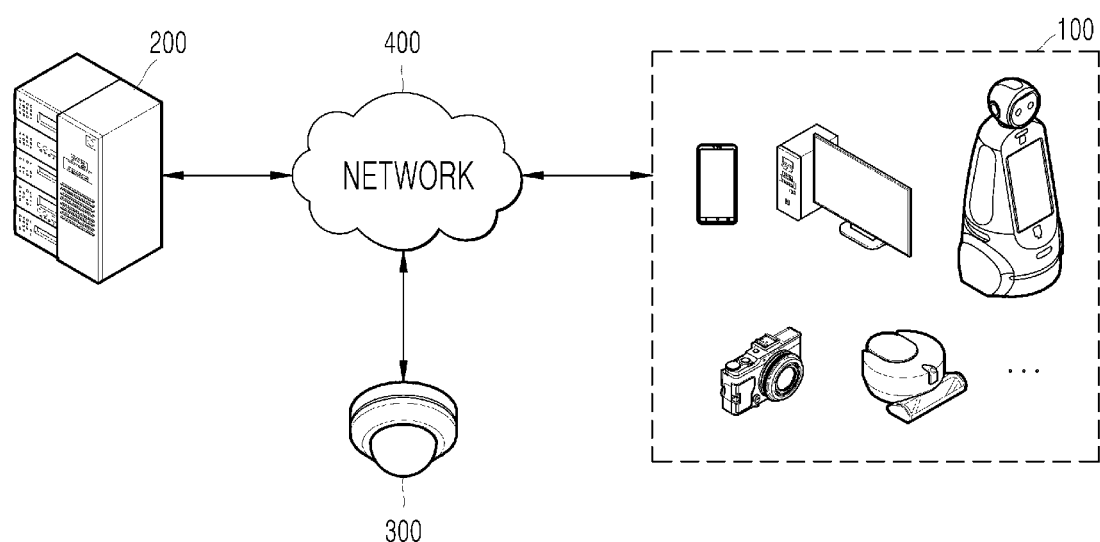

[FIG. 2]
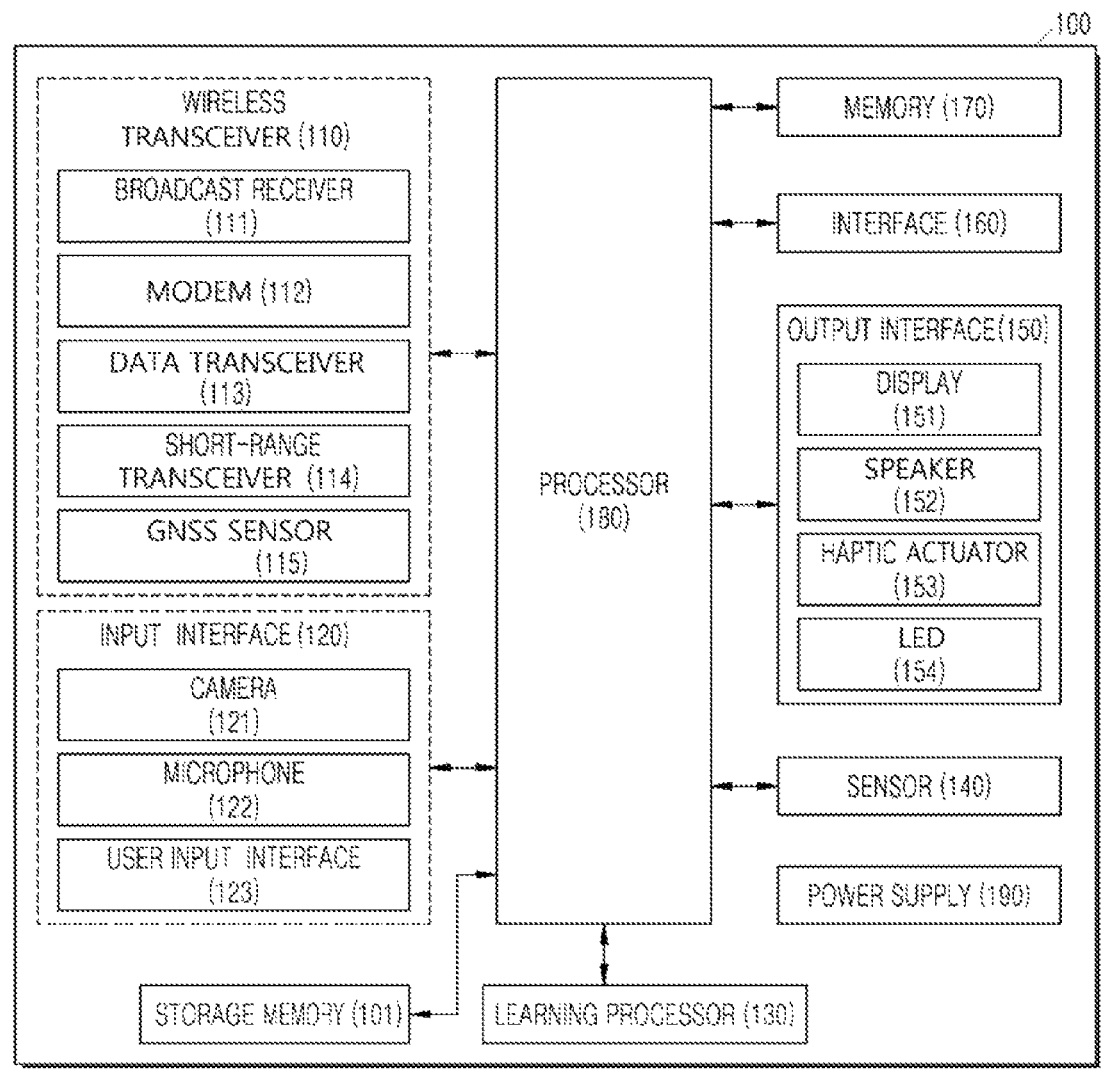

[FIG. 3]
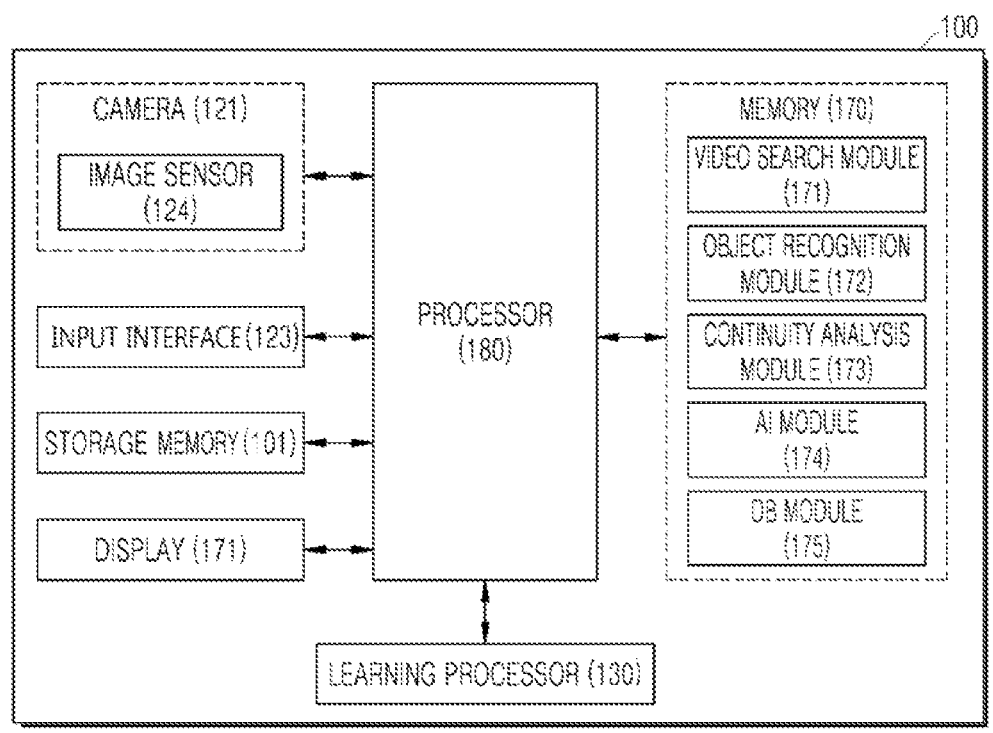

[FIG. 4]
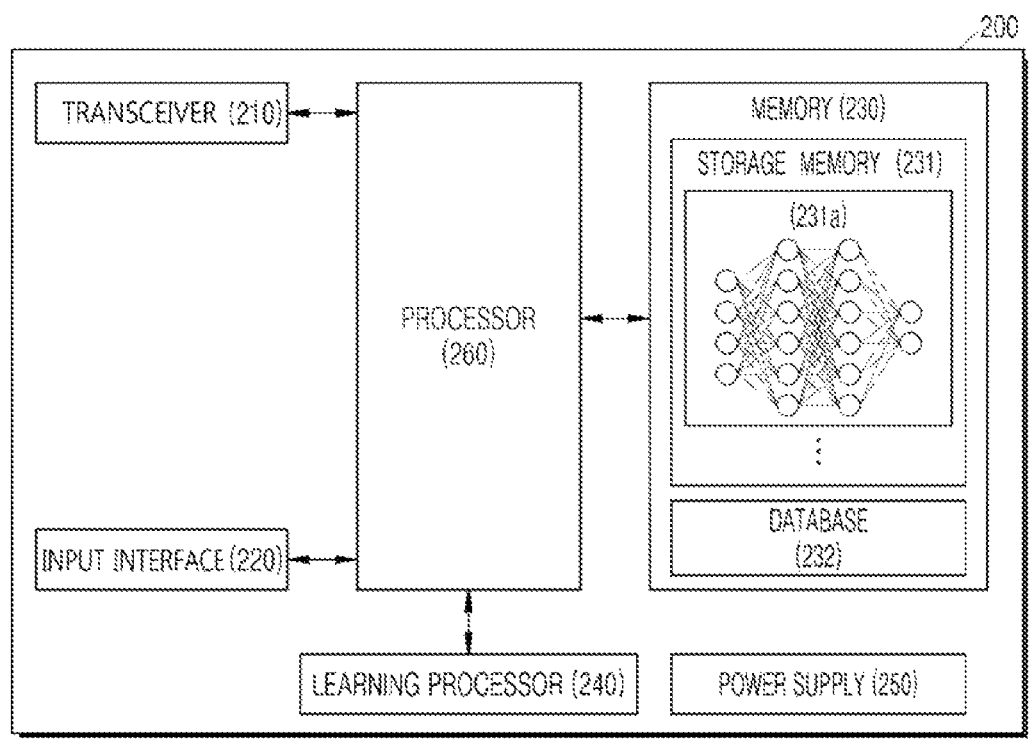

[FIG. 5]
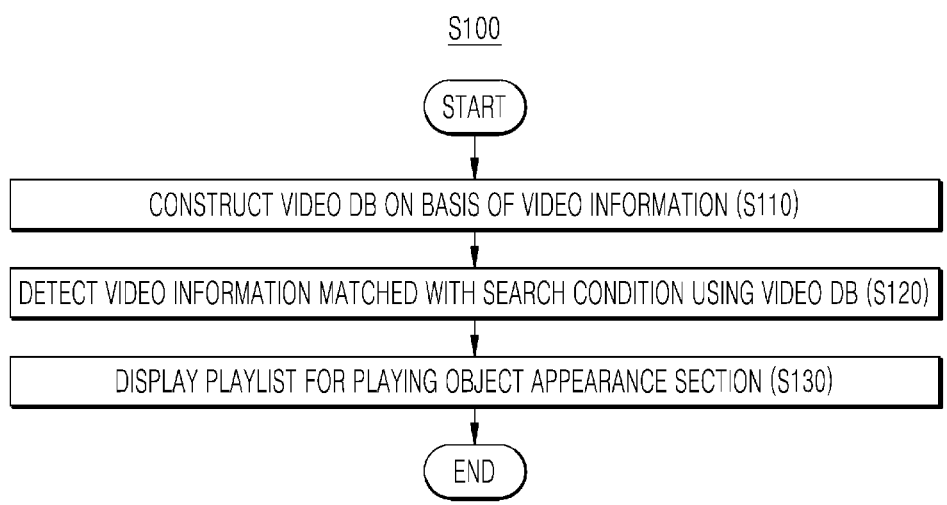

[FIG. 6]
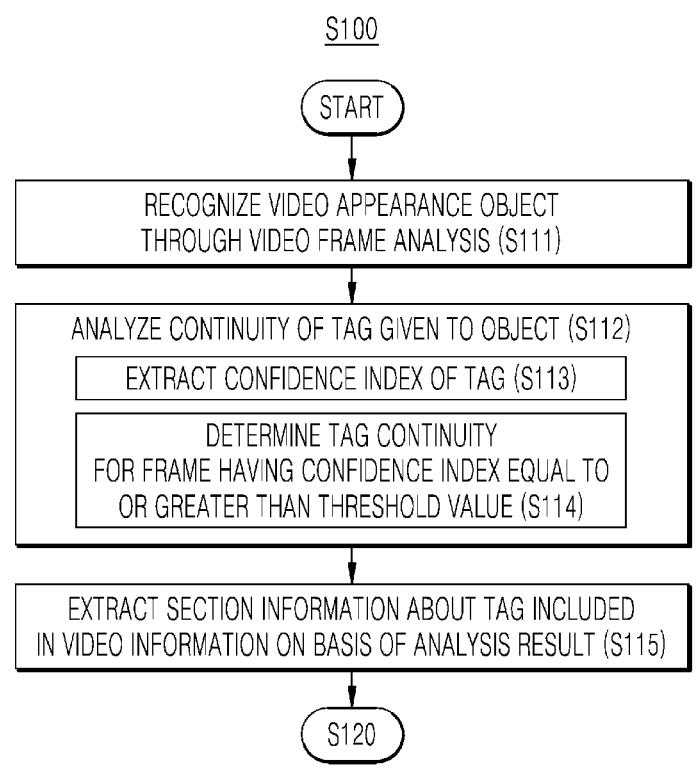

[FIG. 7]

|  | 218.014s | 219.018s | 220.019s | 221.02s | 222.021s | 223.022s | 224.023s | 225.024s | 226.025s | 227.026s | 228.027s | 229.028s | 230.029s | 231.03s | 232.031s | 233.032s |
|---|---|---|---|---|---|---|---|---|---|---|---|---|---|---|---|---|
| drink | 0.856 | 0.955 | 0.955 | 0.972 | 0.966 | 0.987 | 0.875 | 0.961 | 0.376 | 0.726 | 0.659 | 0.824 | 0.935 | 0.996 | 0.988 | 0.998 |
| food | 0.007 | 0.989 | 0.967 | 0.967 | 1.089 | 1.195 | 1.129 | 1.086 | 1.868 | 1.457 | 0.823 | 0.801 | 0.780 | 0.950 | 0.973 | 0.776 |
| vehicle | 0.007 | 0.091 | 0.036 | 0.043 | 0.010 | 0.003 | 0.009 | 0.008 | 0.005 | 0.017 | 0.039 | 0.243 | 0.005 | 0.024 | 0.023 | 0.044 |
| portrait | 0.848 | 0.979 | 0.993 | 0.989 | 0.936 | 0.965 | 0.897 | 0.944 | 0.697 | 0.791 | 1.805 | 2.138 | 1.004 | 1.000 | 2.637 | 3.061 |
| pet | 0.997 | 0.999 | 0.999 | 0.999 | 0.975 | 0.879 | 0.885 | 0.550 | 0.635 | 0.718 | 0.830 | 0.851 | 0.870 | 0.901 | 0.952 | 0.768 |
| PET | 0.007 | 0.102 | 0.100 | 0.112 | 2.752 | 3.080 | 3.115 | 5.055 | 3.408 | 3.572 | 3.490 | 3.331 | 3.977 | 2.515 | 4.907 | 5.218 |
| people | 0.270 | 1.422 | 1.411 | 1.412 | 1.416 | 1.423 | 1.419 | 1.401 | 1.427 | 1.353 | 1.422 | 1.404 | 1.428 | 1.423 | 1.424 | 1.426 |
| eyewear | 0.003 | 0.074 | 0.101 | 0.095 | 0.004 | 0.003 | 0.004 | 0.001 | 0.003 | 0.001 | 2.002 | 2.190 | 0.004 | 0.047 | 0.004 | 0.018 |

[FIG. 8]

| | media_db_id | tag | cut_start_time | cut_end_time | group_start_time | group_end_time | confidence |
|---|---|---|---|---|---|---|---|
| | FILTER | FILTER | FILTER | FILTER | FILTER | FILTER | FILTER |
| 1 | 105 | FOOD | 1034 | 5033 | 100 | 9032 | 1.860107421... |
| 2 | 201 | FOOD | 100 | 3380 | 100 | 13420 | 4.24609375 |
| 3 | 211 | FOOD | 9000 | 13000 | 2000 | 13000 | 4.07568359375 |
| 4 | 211 | kid | 9000 | 13000 | 9000 | 13000 | 3.455078125 |
| 5 | 211 | kid | 3000 | 7000 | 3000 | 7000 | 2.758911132... |
| 6 | 211 | poeple | 9000 | 13000 | 100 | 13000 | 4.384765625 |
| 7 | 211 | portrait | 9000 | 13000 | 2000 | 13000 | 4.26806640625 |
| 8 | 216 | MOON | 8000 | 12000 | 2000 | 24000 | 3.01220703125 |
| 9 | 216 | MOON | 29000 | 33000 | 29000 | 36000 | 2.134521484... |
| 10 | 216 | moon | 31000 | 35000 | 31000 | 35000 | 2.2001953125 |

[FIG. 9]
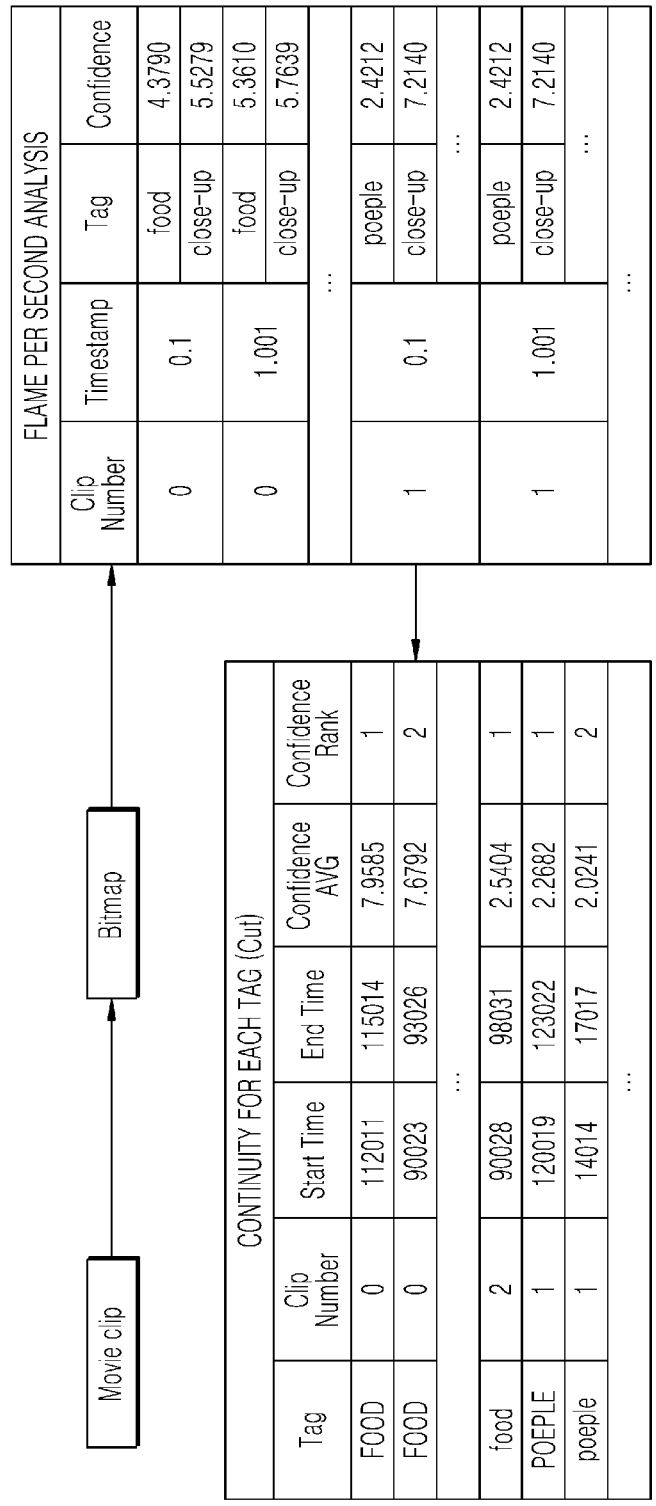

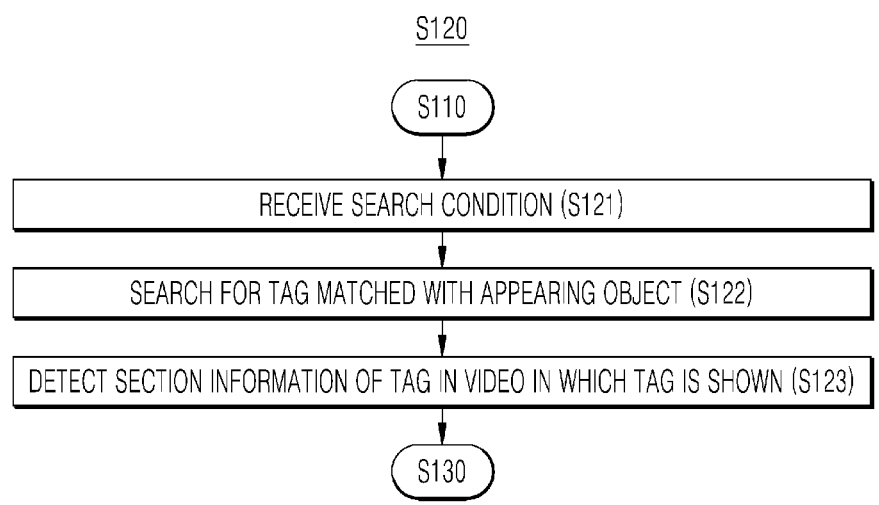
[FIG. 10]

[FIG. 11A]
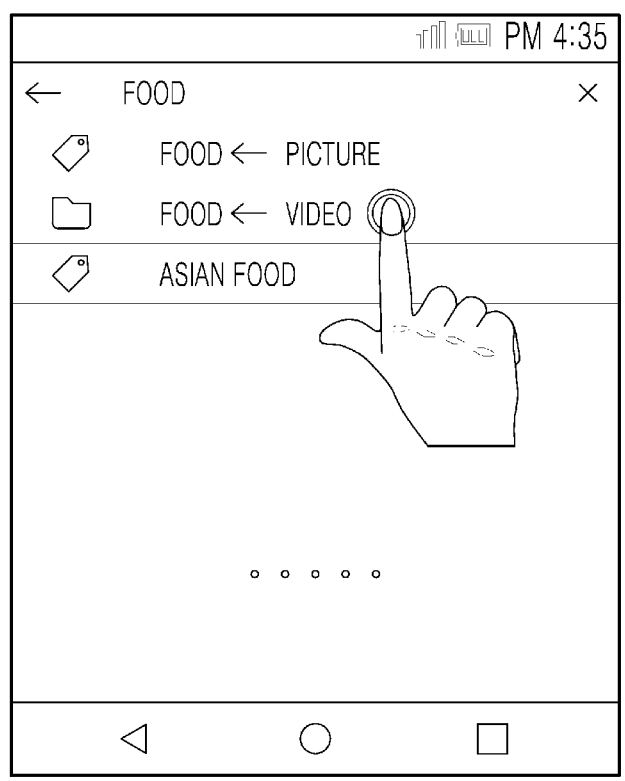

[FIG. 11B]
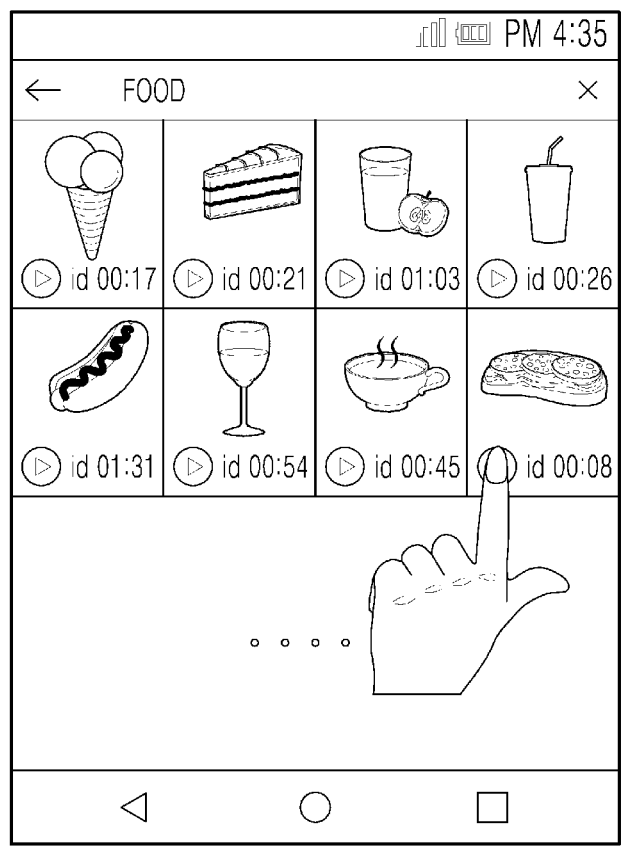

[FIG. 11C]

METHOD FOR SEARCHING VIDEO AND EQUIPMENT WITH VIDEO SEARCH FUNCTION

CROSS-REFERENCE TO RELATED APPLICATION

Pursuant to 35 U.S.C. § 119(a), this application claims the benefit of earlier filing date and right of priority to Korean Patent Application No. 10-2019-0105256, filed on Aug. 27, 2019, the contents of which are hereby incorporated by reference herein in its entirety.

BACKGROUND

1. Technical Field

The present disclosure relates to a method for searching a video and equipment with a video search function, and more particularly, to a method for searching for objects in a video using object recognition, and equipment using the method.

2. Description of Related Art

With the advent of mobile environments represented by smartphones, the media market is being restructured around mobile environments. In a wireless mobile environment, users use broadcast video content in their spare time without limitation as to place.

Even in the case of web content services that once typically provided text and still images, services providing video content are gradually increasing. Further, with the increase in processing speed and capacity of personal portable terminals, more personal content is being stored in the form of video.

Further, past search techniques used for web content and personal content based mainly on still images are not appropriate for searching videos.

As a related art, a mobile terminal and a method for searching videos using the terminal is disclosed. In this related art, disclosed is a process of displaying a calendar, selecting a date in the calendar, displaying video information stored in the selected date, and selecting and playing the video. However, the search method disclosed in this related art is supported by common operating systems, and the contents of videos cannot be used as search conditions.

Further, as another related art, a video search system and method are disclosed. In this related art, a system is disclosed in which a search word is received and a video or sound source file including a voice corresponding to the search word is searched for and displayed. However, the search system disclosed in this related art is limited to searching the sound source contents of several multimedia contents, and thus its range of use is narrow.

SUMMARY OF THE INVENTION

The present disclosure is directed to addressing the issue associated with some related art discussed above in which a search is limited to only searching a voice included in a video.

The present disclosure is directed to addressing the issue associated with some related art in which a search is limited to only searching a recording date of a video.

The present disclosure is directed to solving the problem addressing the issue associated with some related art in which a satisfactory video search result is not obtained because there is no threshold value about a minimum time of appearance when searching for objects in a video.

The present disclosure is directed to addressing the issue associated with some related art in which it is not possible to check an appearing object upon playback of a video in spite of a video search result.

The present disclosure are not limited to what has been described above, and other aspects and advantages of the present disclosure not mentioned above will be understood through the following description of embodiments of the present disclosure. Further, it will be understood that the aspects and advantages of the present disclosure may be achieved by the configurations described in claims and combinations thereof.

A method for searching a video according to an embodiment of the present disclosure may be configured to include constructing a video database (DB) on the basis of video information extracted from a video, and detecting video information that is matched with a search condition using the video DB. The constructing of the video DB may be configured to include recognizing a video appearance object through video frame analysis, analyzing continuity of a tag given to the object, and extracting section information about the tag, which is included in the video information, on the basis of a result of the analyzing.

The recognizing of the video appearance object may be configured to include recognizing an object appearing in a frame using an artificial intelligence model trained through supervised learning. Further, the artificial intelligence model may perform on-device learning that uses a video, corresponding to personal data of a user, in addition to initial learning that uses big data.

The analyzing of the continuity of the tag may be configured to include extracting a confidence index of the tag, and determining tag continuity for a frame in which the confidence index is equal to or greater than a threshold value.

The section information of the tag may include at least one of section information about tags showing continuity of a threshold time or more, or section information about a tag having a relatively high confidence index among the tags showing continuity of the threshold time or more.

The detecting of the video information may be configured to include receiving a video search condition, searching for a tag that is matched with the object, and detecting section information of the tag in a video in which the tag is shown.

The method for searching the video may be configured to further include displaying a playlist for playing a section in which the object appears, as a result of the detecting of the video information.

The playlist may include a thumbnail displayed as a start frame of a section having a relatively high confidence index of a tag among continuous tags, and a timestamp of the start frame that is displayed as a playback start point.

The method for searching the video may be configured to further include automatically playing a highlight image by continuously playing at least one appearance section in at least one video in which objects related to at least one tag appear. Additionally, ID information of the corresponding video may be displayed when the appearance section is played.

The receiving of the search condition may be configured to include receiving at least one of recording time information of the video, a tag related to a recording position, or a tag related to an appearing object through voice input, and recognizing a logical relationship between a plurality of search conditions through speech recognition.

The video information may be configured to further include at least one of video ID information, a tag given to the object, or the confidence index.

Equipment with a video search function according to an embodiment of the present disclosure may be configured to include a storage memory configured to store a video database (DB) constructed on the basis of a video file and video information extracted from the video file, a user input interface configured to receive a video search condition for detection of the video information, and a processor configured to search for video information matched with the video search condition, and construct the video database. The processor may recognize a video appearance object through video frame analysis, analyze continuity of a tag given to the object, and extract section information of a tag included in the video information on the basis of a result of the analyzing.

The processor may recognize an object appearing in a frame using an artificial intelligence model trained through supervised learning. Further, the artificial intelligence model may perform on-device learning using the video, corresponding to personal data of a user, in addition to initial learning using big data.

The processor may extract a confidence index of the tag and determine tag continuity for a frame of which the confidence index is equal to or greater than a threshold value.

The processor may extract at least one of section information about tags showing continuity of a threshold time or more, or section information about a tag having a relatively high confidence index among the tags showing continuity of the threshold time or more.

The processor may search for a tag that is matched with the appearing object, and detect section information of the tag in a video in which the tag is shown, for the video search condition inputted by the user input interface.

The equipment with a video search function may be configured to further include a display displaying a video search result. The processor may control the display to display a playlist for playing a section in which the object appears, as a result of detection of the video information.

The equipment with a video search function may be configured to further include a display configured to display a video search result. The processor may control the display to display a thumbnail displayed as a start frame of a section having a relatively high confidence index of a tag among continuous tags, and a timestamp of the start frame that is displayed as a playback start point.

The equipment with a video search function may be configured to further include a display configured to display a video search result. The processor may control the display to continuously play a highlight image with one or more sections in which an object appears, and to display ID information of the corresponding video when the appearance section is played.

The equipment with a video search function may be configured to further include a display configured to display a video search result. The processor may control the display to continuously play a highlight image with at least one appearance section in at least one video in which objects related to at least one tag appear, and to display ID information of the corresponding video when the appearance section is played.

The equipment with a video search function may be configured to further include a microphone configured to receive at least one of recording time information of a video, a tag about a recording position, or a tag about an appearing object, as a search condition through a voice. The processor may recognize a logical relationship of a plurality of search conditions through speech recognition.

The video information may further include at least one of video ID information, a tag given to the object, or the confidence index.

A method for searching a video comprises constructing a video database (DB) based on video information extracted from the video; and detecting video information that is matched with a search condition using the video DB, wherein constructing the video DB comprises: recognizing an object appearing in the video based on analysis of video frames of the video; determining a continuity of a tag associated with the recognized object; and extracting section information about the tag included in the video information based on the determination.

The object is recognized in a video frame of the video using an artificial intelligence model trained through supervised learning; and the artificial intelligence model is initially trained using an initial training data set and is further trained using on-device learning using the video corresponding to personal data of a user.

Determining the continuity of the tag comprises extracting a confidence index of the tag, and the tag continuity is determined for one or more video frames for which the confidence index is greater than or equal to a threshold value.

The extracted section information comprises at least section information about tags having a continuity greater than or equal to a threshold time; or section information about a tag having a high confidence index among the tags having the continuity greater than or equal to the threshold time.

Detecting of the video information comprises receiving a video search condition; searching the video DB for the video information based on the received video condition;

searching for a tag associated with the object recognized in the video; and determining the section information of the tag.

The method further comprises displaying a playlist for playing a section in which the recognized object appears based on detection of the video information.

The displayed playlist comprises a thumbnail displayed as a start frame of a section having a relatively high confidence index of a tag among continuous tags, and a timestamp of the start frame.

The method further comprises automatically playing a highlight comprising one or more appearance sections of at least one video in which objects related to at least one tag appear; and displaying identification information of a corresponding video when each of the one or more appearance sections is played.

Receiving the video search condition comprises receiving, via a voice input, at least recording time information, a tag related to a recording position, or a tag related to an appearing object; and recognizing a logical relationship between a plurality of search conditions through speech recognition.

The detected video information comprises at least video identification information, a tag given to the object, or a confidence index.

An apparatus with a video search capability, the apparatus comprises a storage memory configured to store a video database (DB) constructed based on a video file and video information extracted from the video file; a user input interface configured to receive a video search condition for searching the video information; and one or more processors configured to search for the video information based on the received video search condition, construct the video DB based on the video information; recognize an object appearing in the video based on analysis of video frames of the video; determine a continuity of a tag associated with the recognized object; and extract section information of a tag included in the video information.

The object is recognized in a video frame of the video using an artificial intelligence model trained through supervised learning; and the artificial intelligence model is initially trained using an initial training data set and is further trained using on-device learning using the video corresponding to personal data of a user.

Determining the continuity of the tag comprises extracting a confidence index of the tag, and the tag continuity is determined for one or more video frames for which the confidence index is greater than or equal to a threshold value.

The extracted section information comprises at least section information about tags having a continuity greater than or equal to a threshold time; or section information about a tag having a high confidence index among the tags having the continuity greater than or equal to the threshold time.

The one or more processors is further configured to detect the video information by searching the video DB for the video information based on the received video search condition; searching for a tag associated with the object recognized in the video, and detecting the section information of the tag, based on the video search condition.

The apparatus further comprises a display, wherein the one or more processors is further configured to control the display to display a playlist for playing a section in which the recognized object appears based on detection of the video information.

The apparatus further comprises a display, wherein the one or more processors is further configured to control the display to display a thumbnail displayed as a start frame of a section having a relatively high confidence index of a tag among continuous tags, and a timestamp of the start frame.

The apparatus further comprises a display, wherein the one or more processors is further configured to control the display to play a highlight comprising one or more appearance sections of at least one video in which objects related to at least one tag appear, and to display identification information of a corresponding video when each of the one or more appearance sections is played.

The apparatus further comprises a microphone configured to receive voice input, wherein receiving the video search condition comprises receiving a voice input comprising at least recording time information, a tag about a recording position, or a tag related to an appearing object, wherein the one or more processors is further configured to recognize a logical relationship between a plurality of search conditions through speech recognition.

The detected video information comprises at least video identification information, a tag given to the object, or a confidence index.

According to the present disclosure, by displaying a playlist including a frame thumbnail matched with a search condition and a timestamp in a video search result, a user can immediately check the search result.

Further, by extracting video information within a range over a minimum confidence index of confidence indexes extracted in the object recognition process and by extracting section information about the section having the highest average confidence index, the accuracy in video search can be increased.

Further, by recognizing an object in an extracted frame using an artificial intelligence model in an idle time period of a terminal, a video database can be automatically constructed.

BRIEF DESCRIPTION OF THE DRAWINGS

FIG. 1 is an exemplary diagram of a network connected with equipment with a video search function according to an embodiment of the present disclosure.

FIG. 2 is a block diagram of the equipment with a video search function according to an embodiment of the present disclosure.

FIG. 3 is a block diagram of a memory shown in FIG. 2.

FIG. 4 is a block diagram of a learning device of an artificial intelligence model according to an embodiment of the present disclosure.

FIG. 5 is a flowchart of a method for searching a video according to an embodiment of the present disclosure.

FIG. 6 is a flowchart of video database construction according to an embodiment of the present disclosure.

FIG. 7 is an exemplary diagram of a video database storing information for each frame according to an embodiment of the present disclosure.

FIG. 8 is an exemplary diagram regarding frame analysis and tag continuity according to an embodiment of the present disclosure.

FIG. 9 is an exemplary diagram of a video database including information about videos according to an embodiment of the present disclosure.

FIG. 10 is a flowchart of detection of video information according to an embodiment of the present disclosure.

FIG. 11A is an exemplary diagram of a video search UI in inputting according to an embodiment of the present disclosure.

FIG. 11B is an exemplary diagram of the video search UI in outputting according to an embodiment of the present disclosure.

FIG. 11C is an exemplary diagram of the video search UI in playing according to an embodiment of the present disclosure.

DETAILED DESCRIPTION

Hereinafter, the embodiments disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is an exemplary diagram of a network connected with equipment with a video search function according to an embodiment of the present disclosure.

Equipment 100 having a video search function according to an embodiment of the present disclosure may be implemented in various forms, such as a mobile terminal, a video processing device such as a computer, a robot, a robot cleaner, a digital camera, and a CCTV system.

The equipment 100 having a video search function may include a camera that acquires videos, a processor that extracts video information from the acquired videos and constructs a video database using the video information, and a storage memory that stores videos and the video database, in a local area, for example, in at least one area of a client area or a server 200 area connected to a network 400.

As one embodiment, a mobile terminal and a digital camera may include a processor and a camera therein, and may include a storage memory in an internal area or a cloud server area.

In a CCTV system, a processor and a storage memory may be provided in a server area, and a camera 300 may be provided in a client area.

A robot and a robot cleaner may acquire videos using a camera provided therein, may store some of the acquired videos in a memory in the robot cleaner, and may store some of the videos in a storage memory of a computer connected to a home network by transmitting them to the computer. In this case, a processor disposed in the computer may process the videos and construct a video DB.

A camera module may be included in the robot. Accordingly, an exhibition robot that guides visitors and provides a photographing service at, for example, an exhibition, and various kinds of other robots, may be included.

Referring to FIG. 1, a mobile terminal, a computer, a robot, a robot cleaner, and a digital camera, which correspond to the equipment 100 having a video search function according to several embodiments of the present disclosure, a monitoring camera 300, and a server 200 are connected for communication through a network 400.

Hereafter, the equipment having a video search function according to an embodiment of the present disclosure is referred to as a 'terminal 100,' and a mobile terminal 100, among several types of terminals, is exemplified.

The server 200 serves to provide various services related to an artificial intelligence model described in an embodiment of the present disclosure to the terminal 100 in association with the artificial intelligence model. The artificial intelligence model will be described in detail below.

The network 400 can be any suitable communication network including a wired and wireless network, for example, a local area network (LAN), a wide area network (WAN), the Internet, an intranet, an extranet, and a mobile network, for example, cellular, 3G, LTE, 5G, Wi-Fi networks, an ad hoc network, and a combination thereof.

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks.

The terminal 100 may transmit and receive data with the server 200, which is a learning device, through a 5G network. Specifically, the terminal 100 may perform data communication with the learning device 200 using at least one service of enhanced mobile broadband (eMBB), ultra-reliable and low latency communications (URLLC), or massive machine-type communications (mMTC), through the 5G network.

eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the high-volume traffic may be accommodated in an area where user mobility is low and user density is high. Through broadband coverage, a wide-range and stable wireless environment and user mobility may be guaranteed.

A URLLC service defines requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. The mMTC enables a much larger number of terminals 300, such as sensors, than general mobile cellular phones to be simultaneously connected to a wireless access network. In this case, the communication module price of the terminal should be inexpensive, and there is a need for improved power efficiency and power saving technology capable of operating for years without battery replacement or recharging.

Artificial intelligence (AI) is an area of computer engineering science and information technology that studies methods to make computers mimic intelligent human behaviors such as reasoning, learning, self-improving, and the like.

In addition, the artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine Learning is an area of artificial intelligence that includes a field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquire problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an ANN will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

The Markov Decision Process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an ANN may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, an ANN is first trained by experimentally setting hyperparameters to various values, and based on the results of training, the hyperparameters can be set to optimal values that provide a stable learning rate and accuracy.

The equipment 100 having a video search function according to an embodiment of the present disclosure, in relation to an artificial intelligence model required for performing an object recognition function, may create various artificial intelligence models, train them, evaluate them, complete them, and use programs related to various artificial intelligence algorithms stored in a local area and the server in the process of updating them using personal data of a user.

Hereafter, an embodiment of the present disclosure is described on the basis of the mobile terminal 100 that is representative of the equipment 100 having a video search function according to several embodiments of the present disclosure. Further, unless other specific assumptions or conditions are provided, the description of the mobile terminal 100 may be applied to other exemplary embodiments as it is.

The server 200 serves to collect learning data required to train various artificial intelligence models and train the artificial intelligence model using the collected data. When various artificial intelligence models trained by the server 200 are completed through evaluation, the mobile terminal 100 may recognize an object using the various artificial intelligence models, or the artificial intelligence models themselves may recognize an object.

FIG. 2 is a block diagram of the equipment with a video search function according to an embodiment of the present disclosure.

The terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an Ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, or a digital signage.

That is, the terminal 100 may be implemented as various home appliances used at home and also applied to a fixed or mobile robot.

The terminal 100 may perform a function of a voice agent. The voice agent may be a program configured to recognize a voice of a user and output a voice corresponding to the voice of the user.

Referring to FIG. 2, the equipment 100 includes a wireless transceiver 110, an input interface 120, a learning processor 130, a sensor 140, an output interface 150, an interface 160, a memory 170, a processor 180, and a power supply 190.

A trained model may be loaded in the equipment 100.

The trained model may be implemented as hardware, software, or a combination of hardware and software, and in cases where the trained model is partially or entirely implemented as software, at least one command constituting the trained model may be stored in the memory 170.

The wireless transceiver 110 may include at least one of a broadcast receiver 111, a modem 112, a data transceiver 113, a short-range transceiver 114, or a GNSS sensor 115.

The broadcast receiver 111 receives a broadcasting signal and/or broadcasting related information from an external broadcasting management server through a broadcasting channel.

The modem 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The data transceiver 113 refers to a module for wireless internet access and may be built in or external to the equipment 100. The data transceiver 113 may be configured to transmit/receive a wireless signal in a communication network according to wireless internet technologies.

The wireless internet technologies may include wireless LAN (WLAN), wireless-fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support short-range communication by using at least one of Bluetooth™, radio frequency identification (RFID), Infrared Data Association (IrDA), Ultra Wideband (UWB), ZigBee, near field communication (NFC), Wi-Fi, Wi-Fi Direct, and Wireless Universal Serial Bus (USB) technologies.

The GNSS sensor 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 which inputs an image signal, a microphone 122 which receives an audio signal, and a user input interface 123 which receives information from the user.

Voice data or image data collected by the input interface 120 is analyzed to be processed as a control command of the user.

The input interface 120 may obtain data such as training data for training a model, and input data used to obtain an output using the trained model.

The input interface 120 may obtain unprocessed input data, and in this case, the processor 180 or the learning processor 130 may preprocess the obtained data and generate training data or preprocessed input data which can be inputted for model training.

In this case, the pre-processing on the input data may refer to extracting of an input feature from the input data.

The input interface 120 is for inputting of image information (or signal), audio information (or signal), data, or information being inputted from a user, and in order to input the image information, the equipment 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical voice data. The processed voice data may be utilized in various forms in accordance with a function which is being performed by the equipment 100 (or an application program which is being executed). In the microphone 122, various noise removal algorithms which remove a noise generated during the process of receiving the external sound signal may be implemented.

The user input interface 123 receives information from the user and when the information is inputted through the user input interface 123, the processor 180 may control the operation of the equipment 100 so as to correspond to the inputted information.

The user input interface 123 may include a mechanical input interface (or a mechanical key, for example, a button located on a front, rear, or side surface of the equipment 100, a dome switch, a jog wheel, or a jog switch) and a touch type input interface. As an example, the touch type input tool may include a virtual key, a soft key, or a visual key displayed on a touch screen via software processing, or may include a touch key disposed on any portion other than the touch screen.

The learning processor 130 trains a model configured by an ANN using the training data.

Specifically, the learning processor 130 repeatedly trains the ANN using various training schemes previously described to determine optimized model parameters of the ANN.

Throughout the present specification, an ANN of which parameters are determined by being trained using training data may be referred to as a trained model.

Here, the trained model may be used to infer result values for the new input data, rather than the training data.

The learning processor 130 may be configured to receive, classify, store, and output information to be used for data mining, data analysis, intelligent decision making, and machine learning algorithm and techniques.

The learning processor 130 may include one or more memories configured to store data which is received, detected, sensed, generated, previously defined, or outputted by another component, device, the terminal, or a device which communicates with the terminal.

The learning processor 130 may include a memory which is combined with or implemented in the terminal. In some exemplary embodiments, the learning processor 130 may be implemented using the memory 170.

Selectively or additionally, the learning processor 130 may be implemented using a memory related to the terminal, such as an external memory which is directly coupled to the terminal or a memory maintained in the server which communicates with the terminal.

According to another exemplary embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

Examples of such algorithms include, for example, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, and automated planning.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processor, an environmental condition module, a speech to text (STT) processor, a natural language processor, a workflow processor, and a service processor.

The sub modules may have an access to one or more systems or data and a model, or a subset or a super set thoseof in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage memory through a transceiver.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology and updates the information which is previously learned based on the analyzed information.

Accordingly, the processor 180 may improve precision of a future performance of the data analysis and the machine learning algorithm and technology based on the updated information, together with the learning processor 130.

The sensor 140 may include one or more sensors which sense at least one of information in the terminal, surrounding environment information around the terminal, or user information.

For example, the sensor 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), or a chemical sensor (for example, an electronic nose, a healthcare sensor, or a biometric sensor). In addition, the terminal 100 disclosed in the present disclosure may combine various kinds of information sensed by at least two of the above-mentioned sensors and may use the combined information.

The output interface 150 is intended to generate an output related to a visual, aural, or tactile stimulus and may include at least one of a display 151, a speaker 152, haptic actuator 153, or an LED 154.

The display 151 displays (outputs) information processed in the equipment 100. For example, the display 151 may display execution screen information of an application program driven in the equipment 100 and user interface (UI) and graphic user interface (GUI) information in accordance with the execution screen information.

The display 151 may form a mutual layered structure with a touch sensor or is formed integrally to be implemented as a touch screen. The touch screen may simultaneously serve as a user input interface 123 which provides an input interface between the equipment 100 and the user and provide an output interface between the equipment 100 and the user.

The speaker 152 may output audio data received from the wireless transceiver 110 or stored in the memory 170 in a call signal reception mode, a phone-call mode, a recording mode, a voice recognition mode, or a broadcasting reception mode.

The speaker 152 may include at least one of a receiver, a speaker, or a buzzer.

The haptic actuator 153 may generate various tactile effects that the user may feel. A representative example of the tactile effect generated by the haptic module 153 may be vibration.

The LED 154 outputs a signal for notifying occurrence of an event using light of a light source of the equipment 100. Examples of the event generated in the equipment 100 may be message reception, call signal reception, missed call, alarm, schedule notification, email reception, and information reception through an application.

The interface 160 serves as a pathway between various types of external devices which are connected to the equipment 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The equipment 100 may perform appropriate control related to the connected external device in accordance with the connection of the external device to the interface 160.

The identification module is a chip in which various information for authenticating a usage right of the equipment 100 is stored, and may include a user identification module (UIM), a subscriber identify module (SIM), and a universal subscriber identity module (USIM). The device with an identification module (hereinafter, "identification device") may be manufactured as a smart card. Accordingly, the identification device may be connected to the equipment 100 through the interface 160.

The memory 170 stores data which supports various functions of the equipment 100.

The memory 170 may store various application programs (or applications) driven in the equipment 100, data for the operation of the equipment 100, commands, and data (for example, at least one algorithm information for machine learning) for the operation of the learning processor 130.

The memory 170 may store the trained model in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may not only be data which is processed to be suitable for the model learning but also input data itself which is not processed.

In addition to the operation related to the application program, the processor 180 may generally control an overall operation of the equipment 100. The processor 180 may process a signal, data, or information which is inputted or outputted through the above-described components or drives the application programs stored in the memory 170 to provide or process appropriate information or functions to the user.

Further, in order to drive the application program stored in the memory 170, the processor 180 may control at least some of components described with reference to FIG. 2. Moreover, the processor 180 may combine and operate at least two of components included in the equipment 100 to drive the application program.

Meanwhile, as described above, the processor 180 may control an operation related to the application program and an overall operation of the equipment 100. For example, when the state of the terminal satisfies a predetermined condition, the processor 180 may execute or release a locking state which restricts an input of a control command of a user for the applications.

The power supply 190 is applied with external power or internal power to supply the power to the components included in the equipment 100 under the control of the processor 180. The power supply 190 includes a battery and the battery may be an embedded battery or a replaceable battery.

The terminal 100 may be configured to further include a storage memory 101 that stores a video database constructed using video files and video information extracted from videos.

FIG. 3 is a block diagram of a memory shown in FIG. 2.

Referring to FIG. 3, the components of a memory 170 included in the terminal 100 are briefly shown. In the memory, various computer program modules may be loaded. Other than an operating system and system programs that manage hardware, a search module 171, a recognition module 172, an analysis module 173, an artificial intelligence module 174, and a database module 175 may be included in the category of computer programs that are installed in the memory 170.

In relation to the video search module 171, functions of inputting a video search condition, searching for a tag matched with an appearing object inputted in the search condition, and detecting section information of the tag from a video having the tag may be performed through various calculation functions of the processor 180.

In relation to the object recognition module, functions of detecting an object area from a video frame and recognizing an object matched with metadata, for example, a tag, as an object displayed in the detected object area, may be performed through various calculation functions of the processor 180.

In relation to the continuity analysis module 173, functions of extracting a confidence index of a tag corresponding to an object and determining continuity of a tag for a frame in which the confidence index is equal to or greater than a threshold value may be performed through various calculation functions of the processor 180.

In relation to the artificial intelligence model 174, a function of recognizing an object in an extracted frame may be performed through various calculation functions of the processor 180. Further, the artificial intelligence model may include a neural network model that performs machine learning and deep learning.

In relation to the database module 175, functions of constructing a video DB on the basis of video information and updating the constructed video DB using newly extracted video information may be performed through various calculation functions of the processor 180.

FIG. 4 is a block diagram of a learning device of an artificial intelligence model according to an embodiment of the present disclosure.

The learning device 200 is a device or a server which is separately configured outside of the equipment 100, and may perform the same function as the learning processor 130 of the equipment 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one equipment 100 and derive a result by analyzing or learning the data on behalf of the equipment 100. Here, "on behalf of the other device" may refer to a distribution of computing power by means of distributed processing.

The learning device 200 of the artificial neural network may be various devices for learning an artificial neural network, and normally refers to a server. The learning device 200 may be referred to as a learning device or a learning server.

Specifically, the learning device 200 may be implemented as a single server or as a plurality of server sets, a cloud server, or a combination thereof.

That is, the learning device 200 may be configured as a plurality of learning devices to configure a learning device set (or a cloud server), and at least one learning device 200 included in the learning device set may derive a result by analyzing or learning the data through distributed processing.

The learning device 200 may transmit a model trained by the machine learning or the deep learning to the equipment 100 periodically or upon request.

Referring to FIG. 4, the learning device 200 may include a transceiver 210, an input interface 220, a memory 230, a learning processor 240, a power supply 250, a processor 260, and so forth.

The transceiver 210 may correspond to a configuration including the wireless transceiver 110 and the interface 160 of FIG. 2. That is, the transceiver may transmit and receive data with the other device through wired/wireless communication or an interface.

The input interface 220 is a configuration corresponding to the input interface 120 of FIG. 2, and may obtain data by receiving the data through the transceiver 210.

The input interface 220 may obtain data such as training data for training a model, and input data used to obtain an output using the trained model.

The input interface 220 may obtain unprocessed input data, and in this case, the processor 260 may preprocess the obtained data to generate training data to be inputted to the model learning or preprocessed input data.

In this case, the pre-processing on the input data performed by the input interface 220 may refer to extracting of an input feature from the input data.

The memory 230 is a configuration corresponding to the memory 170 of FIG. 2.

The memory 230 may include a storage memory 231, a database 232, and so forth.

The storage memory 231 stores a model (or an artificial neural network 231a) which is learning or trained through the learning processor 240 and, when the model is updated through the learning, stores the updated model.

If necessary, the storage memory 231 may store the trained model by dividing the model into a plurality of versions depending on a training timing or a training progress.

The artificial neural network 231a illustrated in FIG. 4 is one example of an artificial neural network including a plurality of hidden layers, but the artificial neural network of the present disclosure is not limited thereto.

The artificial neural network 231a may be implemented as hardware, software, or a combination of hardware and software, and when the artificial neural network 231a is partially or entirely implemented as software, at least one command constituting the artificial neural network 231a may be stored in the memory 230.

The database 232 stores input data obtained from the input interface 220, learning data (or training data) used for model learning, a learning history of the model, and so forth.

The input data stored in the database 232 may be data which is processed to be suitable for model training, as well as unprocessed input data.

The learning processor 240 is a configuration corresponding to the learning processor 130 of FIG. 2.

The learning processor 240 may the artificial neural network 231a using training data or a training set.

The learning processor 240 may train the artificial neural network 231a by immediately acquiring preprocessed input data that the processor 260 has obtained through the input interface 220, or obtain preprocessed input data stored in the database 232.

Specifically, the learning processor 240 may repeatedly train the artificial neural network 231a using various learning techniques described above to determine optimized model parameters of the artificial neural network 231a.

In this specification, an artificial neural network of which parameters are determined by being trained using training data may be referred to as a trained model.

Here, the trained model may be loaded in the learning device 200 to deduce result values, or may be transmitted to and loaded in other devices, such as the terminal 100, through the transceiver 210.

Further, when the trained model is updated, the updated trained model may be transmitted to and loaded in other devices, such as the terminal 100, via the transceiver 210.

The power supply 250 is a configuration corresponding to the power supply 190 of FIG. 2.

Redundant description for corresponding configurations will be omitted.

Further, the learning device 200 may evaluate the artificial intelligence model 231a, and even after the evaluation, may update the artificial intelligence model 231a and provide the updated artificial intelligence model 231a to the terminal 100 for better performance. Here, the terminal 100 may perform a series of steps performed by the learning device 200 solely in a local area or together with the learning device 200 through the communication with the learning device 200. For example, by training the artificial intelligence model 174 in a local area with the personal pattern of a user through secondary training that uses personal data of the user, the terminal 100 may update the artificial intelligence model 174 downloaded from the learning device 200.

FIG. 5 is a flowchart of a method for searching a video according to an embodiment of the present disclosure.

Referring to FIG. 5, a method for searching a video according to an embodiment of the present disclosure may be configured to include a video database (DB) construction process (S110), a video information extraction process using the video DB (S120), and a playlist display process as the result of detection of video information (S130). The processes are described in detail hereafter.

The processor 180 may construct a video database (DB) on the basis of video information (S110).

The video information that is used in the method for searching a video according to an embodiment of the present disclosure may include at least one of video ID information, a tag given to an object appearing in a video, a confidence index about a tag, or section information about appearance of an object.

A process of updating a previously constructed video DB may be included in construction of the video DB. Even after constructing the video DB, the processor 180 may extract video information about a new video and update the existing video DB using the video information.

The process of updating a video DB may be performed on video files photographed by a mobile terminal and a digital camera and stored in a memory, video files photographed by a CCTV system and stored on a hard disk, and video files photographed during operation of a robot or a robot cleaner and stored in an internal memory or a server area.

Before performing a video DB update, the processor 180 may determine when to perform the video DB update. The video DB update may be performed at a time period set by a user, but when there is no performing time set by a user, the processor 180 may determine a time period to perform the video DB update on the basis of several conditions. It is preferable that the video DB update be performed at a time period when the user does not use the mobile terminal, that is, does not use the equipment having a video search function. Accordingly, the processor 180 may update the video DB while the user is asleep.

In general, the processor 180 may determine a sleeping time period of the user on the basis of at least one of time information of the terminal 100 that shows a night time period at which the user is expected to sleep, or a decrease in the amount of power consumption of the terminal 100, for example, the amount of power consumption depending on whether or not the display 171, the user input interface 123, and the transceiver 110 are operating. That is, the processor 180 may construct and update the video DB when the terminal 100 is in an idle mode.

FIG. 6 is a flowchart of video DB construction according to an embodiment of the present disclosure.

Referring to FIG. 6, the processor may recognize an object appearing in a video through video frame analysis (S111).

Recognizing an appearing object may be configured to include extracting a frame from a video, analyzing the extracted frame, and assigning a tag on the basis of the analysis result. The processor 180 may extract a specific file format, for example, a bitmap frame, that is, a still image, from a video at predetermined time intervals, for example, every one second. Since a video file is configured to include tens of still images (that is, frames) per second, the processor 180 may extract one of several frames constituting a video at predetermined time intervals. The time intervals may be constant, but need not be constant to the second decimals thereof, and the time intervals may be adjusted within an error range such that a focused object is extracted. For accurate object extraction, re-extraction may be performed after object recognition.

The processor 180 may recognize an object appearing in a frame by analyzing the extracted frame. Object recognition may be performed by a process similar to face recognition (which identifies people) through image analysis, but may undergo a less complicated process than face recognition.

Object recognition, which is a computer vision technology that identifies objects in an image or a video, may be calculated through at least one of deep learning or machine learning algorithms.

In the method for searching a video according to an embodiment of the present disclosure, a machine leaning model may be used for object recognition. Examples of machine learning models that may be used for object recognition include HOG feature extraction using a support vector machine (SVM) learning model, a bag-of-words (BoW) model using features such as SURF and MSER, and a Viola-Jones algorithm, which is the first object detection framework to provide competitive object detection rates in real-time and may be used for recognizing various objects including a face and an upper body.

A machine learning model, as compared with a deep learning model, does not need a high-performance graphics processing unit (GPU), and may be trained using relatively less learning data. A machine leaning model for the method for searching a video according to an embodiment of the present disclosure has been trained to recognize 516 objects, from airplanes to wristwatches, which are expected to appear in videos taken by the mobile terminal 100, and this training continues to be performed into the present.

In the method for searching a video according to an embodiment of the present disclosure, an object recognition method using deep learning may also be used. A deep learning model such as a convolutional neural network (CNN) is used to automatically learn the peculiar features of an object in order to identify the object in object recognition using deep learning. In order to train the deep learning model, large data sets with designated labels are collected, and features are learned and a model is completed with a network architecture based on design. In order to achieve a high recognition rate, a large amount of training data is required, and a layer and a weight should be set in the CNN.

Further, on-device learning, including a method of finely adjusting a previously trained model using a previously trained deep learning model, that is, transfer learning, may be used. In this manner, new data including a class not previously known may be additionally injected using an existing network such as AlexNet or GoogLeNet.

Video appearance object recognition (S111) may be configured to include recognizing an object which appears in a frame using an artificial intelligence model trained through learning. Further, the artificial intelligence model may perform on-device learning that uses a video, corresponding to personal data of a user, in addition to initial learning that uses big data.

A neural network model that performs machine learning and deep learning in various fields of artificial intelligence models may recognize an object appearing in an input frame on the basis of a learning result. The learning process of the neural network model may be configured to include primary learning and secondary learning processes step by step.

The primary learning process may be performed by the learning device 200, and the secondary learning process may be performed by the terminal 100. If big data collected by the learning device 200 is used as primary learning data, that is, a training data set, user data collected in person by the terminal 100, for example, frames extracted from videos collected through the camera 121 included in the terminal 100, may be used as a secondary training data set.

The terminal 100 may use frames, which have been used as test data, as secondary learning data, or may use collected user data only for one use. A learning process that is performed by the terminal 100 corresponds to on-device learning. The terminal 100 may be trained to be suitable for user data processing through the on-device learning.

The processor 180 may designate metadata, that is, a tag assigned to the object recognized using the frame analysis result. Tag designation is a process that puts tag information into a video file by matching it to a corresponding frame constituting the video file.

FIG. 7 is an exemplary diagram of a video database storing information for each frame according to an embodiment of the present disclosure.

The processor 180 may extract one frame at predetermined intervals, for example, every second, from a video. Further, the processor 180 may recognize objects from the extracted frames using an object recognition algorithm, for example, a convolutional neural network (CNN). The convolutional neural network may recognize objects appearing in frames with a predetermined confidence index.

The confidence index of a tag recognized through the convolutional neural network is displayed. The confidence index may be estimated differently depending on the amount of learning data and the image quality of test frames that were used for learning that the convolutional neural network performed.

Referring to FIG. 7, the tag of an object of which the tag has been recognized is shown in each row, and a timestamp of an extracted frame is shown in each column. Further, a confidence index for the extracted frame is shown for each tag. The confidence index may be expressed as a value of 0 or more.

The processor 180 may analyze the continuity of the tags given to the objects. The processor 180 may extract the confidence index of a tag (S113), and may determine the continuity of the tag on the basis of the confidence index of the extracted tag (S114). In order for an object appearing in a frame to be recognized through human eyes in a video that is being played, the object should continuously appear in continuous frames for a predetermined time.

For example, when one frame is extracted per second, if there is only one frame in which a predetermined object appears, that is, if frames are extracted at timestamps 1 s, 2 s, and 3 s, and an object that has not appeared at 1 s appears at 2 s and does not appear again at 3 s, the maximum time for which the object appears is within 2 seconds, and may be less depending on the case. Accordingly, in order to take an object which continuously appears for a predetermined time as the target for video information collection, the continuity of the tag given to the object needs to be analyzed. Further, the same object should continuously appear as a precondition for continuity analysis of a tag. Further, whether the object is the same may be determined probabilistically through the confidence index.

The processor 180 may extract the confidence index of a tag (S113). The confidence index of a tag is the result of a frame analysis process for object recognition. The processor 180 may extract the confidence index of each of extracted frames after the analysis process.

In the method for searching a video according to an embodiment of the present disclosure, frame analysis may be performed through an artificial intelligence model, for example, a neural network model that performs machine learning, particularly, deep learning. In the neural networks described above, the convolutional neural network (CNN) may be used in frame analysis for object recognition.

The CNN may display whether or not an object is recognized using a probability value of an object existing in an input frame by analyzing pixels constituting a frame through several layers according to learning. This probability value corresponds to a confidence index. The confidence index may be distributed in various ways, depending on the amount of data learned and the image quality of an input frame.

The processor 180 may determine tag continuity in frames having a confidence index equal to or greater than a threshold value (S114).

The range of a confidence index that may be expressed in the method for searching a video according to an embodiment of the present disclosure is 0 or more, and the threshold value of the confidence index of a tag, which may be a target for determining continuity of tags, for example, may be set as 1. Accordingly, the processor 180 may determine the continuity of a tag for tags having a confidence index of 1 or more.

The processor may extract section information about tags to be included in video information on the basis of the result of analyzing the continuity of tags (S115).

Referring to FIG. 7 again, tags that have a confidence index of 1 or more and have been continuously recognized are shown. For example, six tags in the section from 222.021 s to 227.026 s, that is, in terms of time, tags in a section of 5 seconds may correspond to one group, and four tags in the section from 224.023 s to 227.926 s in the group, that is, in terms of time, tags in a section of 3 seconds, may correspond to one cut.

The group, which is one item of section information of tags, may be defined as section information about a tag showing continuity over a threshold time. Further, the cut may be defined as section information about a tag having a relatively high confidence index of the tags in a group. That is, the cut may be defined as section information of a section having the highest average confidence index of tags showing continuity over a threshold time.

At least one of a minimum time or a maximum time may be set as a cut section. In the method for searching a video according to an embodiment of the present disclosure, the maximum time of a cut section may be set as 3 seconds.

Referring to FIG. 7 again, calculating the average of the confidence indexes of tags in a section of 3 seconds, that is, four continuous tags of six tags in the section from 222.021 s to 227.026 s, there are three cut sections, and the average confidence index of the cut section from 224.023 s to 227.926 s is the maximum. Accordingly, the section from 224.023 s to 227.926 s may be set as a cut section. The start timestamp of the cut section may be shown as a playback start point in a playlist of a search result.

FIG. 8 is an exemplary diagram of a video database including information about videos according to an embodiment of the present disclosure.

Referring to FIG. 8, the storage type of video information extracted from a video and stored in a video database is shown as an example.

The numbers in the first column are serial number of objects extracted from a video. Further, the second column to the eighth column are respectively a video ID, a tag, a start time of a cut section, an end time of a cut section, a start time of a group section, an end time of a group section, and the confidence index of a cut section.

The processor 180 may update a video database for a new video, that is, a video for which the video information has not been stored in the video database. The process of updating a database by the processor 180 may be performed as follows. First, the processor 180 extracts a frame from a video, selects a tag corresponding to an object recognized in the extracted frame, and stores the tag in the frame. Further, the processor determines a group section through continuity analysis of the tag, and stores start time and end time information of the group section.

Further, the processor 180 may determine a section showing a relatively high confidence index of the group section as a cut section, and may store the start time and the end time of the cut section. Finally, the processor 180 calculates and stores the average confidence index of the cut section.

The processor may separately attach a tag to common objects and close-up objects in the objects recognized in a frame. The method of showing close-up objects may vary, and for example, referring to FIG. 8, the processor 180 may show a close-up object using a capitalized tag. A frame in which a close-up object is shown corresponds to a single shot, unlike a frame in which a common object is shown. When a user wants video information about only a close-up object, the user may input a search condition limited to a close-up object. Frame extraction from a video, frame analysis, and continuity analysis of a tag included in video DB construction are described above. Hereafter, an embodiment of frame analysis and continuity analysis of a tag included in video DB construction will be described with reference to a single figure.

FIG. 9 is an exemplary diagram regarding frame analysis and tag continuity according to an embodiment of the present disclosure.

After extracting a video frame, for example, a bitmap from a video file, that is, a video clip, the processor 180 may analyze the frame and extract a confidence index of a tag using the extracted bitmap. Referring to FIG. 9, among tags given to foods appearing in the video clip, the processor 180 may assign a close-up tag to frames in which a close-up of food appears, in contrast to the tag ("food") given to common foods.

The processor 180 may extract the clip number in which an object appears, the timestamp of a frame in which the object appears, and a tag of the appearing object through frame analysis, and may additionally extract the order of the confidence of the tag. In a table showing continuity of each tag, a capitalized tag is usually shown in a face shot, in which a close-up of food and a close-up of a person appear.

The processor 180 may detect video information that is matched with a search condition using a video DB (S120).

FIG. 10 is a flowchart of detection of video information according to an embodiment of the present disclosure.

Referring to FIG. 10, the processor 180 may receive a video search condition (S121). A user may input a search condition into a search window using a user interface (UI) and a user input interface 123 provided by the display 171. The inputted search condition is transmitted from the user input interface 123 to the processor 180.

Referring back to FIG. 2, the equipment 100 with a video search function according to an embodiment of the present disclosure may be configured to include a microphone 122 that receives at least one of recording time information of a video, a tag about a recording position, or a tag about an appearing object, as a search condition through a voice.

Further, the processor 180 may recognize the logical relationship of a plurality of search conditions through speech recognition.

For example, in order to search section information in which sea and mountains both appear in videos taken on Jeju island in the summer of the previous year, it is very difficult to input a search condition satisfying the section information through text. In particular, it may take much time to input text through the user input interface 123 or a touch screen of the mobile terminal 100.

When it is necessary to input a plurality of search conditions, the processor 180 may recognize the plurality of search conditions and the logical relationship between the search conditions, for example, which of AND, OR, or NOT is meant, through speech recognition. The speech recognition process may be performed at an edge end, that is, the terminal 100, or may be performed at a server end, that is, a speech recognition server.

The processor 180 may search for a tag that is matched with an appearing object (S122). The processor 180 that has received a search condition may detect video information in which an object input as the search condition appears. In detail, the processor 180 may search for the tag attached to an object shown in the frame of a video that is the target of the search in the video information.

The processor 180 may detect section information of the tag from the video in which the searched tag is shown (S123). That is, the processor 180 may detect section information of the tag of a corresponding video extracted in step S115 and stored in a video DB.

The processor 180 may control the display 151 to display a playlist for playing the object appearance section (S130).

FIG. 11A is an exemplary diagram of a video search UI in inputting according to an embodiment of the present disclosure.

The range of tags that may be inputted as search conditions for video search depends on the learning range through an artificial intelligence model. That is, video search may be possible within a tag range given to objects recognized through learning.

Referring to FIG. 11A, an example view is shown of a UI about a picture search window and a video search window when 'food,' which is metadata given to a recognized object, that is, a tag, is inputted in a search window as a search condition. As described above, a search condition may be inputted with a search target limited to a still image or video type.

The processor 180 may control the display 151 to display video information detected as a search result in accordance with a search request from a user. In detail, the processor 180 may show a thumbnail in which an object corresponding to a tag inputted as a search condition appears, and the start time of a cut section as section information. Such display of the thumbnail and the start time of the cut section may be used as a playlist.

FIG. 11B is an exemplary diagram of the video search UI in outputting according to an embodiment of the present disclosure.

Referring to FIG. 11B, a playlist including video information as a video search result is shown. The playlist may include a thumbnail corresponding to a frame extracted from a video in which the corresponding object appears, and a timestamp where the object starts to appear.

A user may play the video in which the object shown in the thumbnail appears by touching a thumbnail area. In this case, since playback starts at the start time of the cut section, a user does not need to make an unnecessary skip motion to search for a section in which the object appears.

FIG. 11C is an exemplary diagram of the video search UI in playing according to an embodiment of the present disclosure.

Referring to FIG. 11C, in response to a touch on the thumbnail area by the user, the processor 180 may control a player to play the corresponding video from the timestamp (00:08) shown in the thumbnail. FIG. 11 shows an object of a tag inputted as a search condition appearing in a video immediately upon playback.

The processor 180 may play a highlight image by connecting at least one appearance section of at least one video in which objects related to at least one tag appear. Further, the processor 180 may control the display such that ID information of a corresponding video is also displayed at the point in time when an appearance section is played. Further, using the highlight image playback function, the processor 180 may create an image album with a predetermined subject. Further, the processor 180 may create an edited image including a highlight playback section.

As described above, according to embodiments of the present disclosure, by displaying a playlist including a frame thumbnail matched with a search condition and a timestamp in a video search result, a user can immediately check a search result.

Further, by extracting video information within a range over a minimum confidence index of confidence indexes extracted in the object recognition process and by extracting section information about the section having the highest average confidence index, the accuracy in video search can be increased.

Further, by recognizing an object in an extracted frame using an artificial intelligence model in an idle time period of a terminal, a video database can be automatically constructed.

The embodiments of the present disclosure described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an," and "the" in this present disclosure, in particular, claims, may be intended to include the plural forms as well. Also, it should be understood that any numerical range recited herein is intended to include all sub-ranges subsumed therein (unless expressly indicated otherwise), and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for searching a video, comprising:
   constructing a video database (DB) based on video information extracted from a plurality of videos, wherein each of the plurality of videos is composed of a plurality of video frames; and
   detecting video information that is matched with a search condition using the video DB,
   wherein constructing the video DB comprises:
   recognizing at least one object in video frames of each of the plurality of videos;
   tagging the at least one object in a corresponding frame in which the at least one object is recognized;
   determining a continuity of the tag by identifying whether the same tag is in consecutive frames among the plurality of frames;
   extracting first section information through the determined continuity of the tag based on the video information, wherein the first section information corresponds to a group of tags having continuity over a first threshold time; and
   extracting second section information corresponding to tags of the group having a relatively high confidence index over a second threshold time within the first threshold time, wherein a cut is set to correspond to a section having a highest average confidence index over the second threshold time,
   wherein the first section information includes a time from a start frame to a last frame in which the same tag is identified over the first threshold time, and the second section information includes a start time and an end time corresponding to the section having the highest average confidence index over the second threshold time.

2. The method of claim 1, wherein:
   the at least one object is recognized in the video frames of each of the plurality of videos using an artificial intelligence model trained through supervised learning; and
   the artificial intelligence model is initially trained using an initial training data set and is further trained using on-device learning using the video corresponding to personal data of a user.

3. The method of claim 1, wherein detecting of the video information comprises:
   receiving the search condition;
   searching the video DB for a video including a tag matching the search condition.

4. The method of claim 3, wherein receiving the video search condition comprises:
   receiving, via a microphone, at least recording time information, a tag related to a recording position, or a tag related to an appearing object; and
   recognizing a logical relationship between a plurality of search conditions through speech recognition.

5. The method of claim 1, further comprising displaying a playlist for playing a section in which the recognized object appears based on detection of the video information.

6. The method of claim 5, wherein the displayed playlist comprises a thumbnail displayed as a start frame of a section having the relatively high confidence index of a tag among continuous tags, and a timestamp of the start frame.

7. The method of claim 1, further comprising:
   automatically playing a highlight comprising one or more appearance sections of at least one video in which objects related to at least one tag appear; and
   displaying identification information of a corresponding video when each of the one or more appearance sections is played.

8. The method of claim 1, wherein the detected video information comprises at least video identification information, a tag given to the object, or a confidence index.

9. An apparatus with a video search capability, the apparatus comprising:
   a storage memory configured to store a video database (DB) constructed based on a plurality of video files and video information extracted from the plurality of video files;
   a user input interface configured to receive a video search condition for searching the video information; and
   one or more processors configured to:
   recognize at least one object in frames of a plurality of frames of each of the plurality of video files;
   tag the at least one object in a corresponding frame in which the at least one object is recognized;
   determine a continuity of the tag by identifying whether the same tag is in consecutive frames among the plurality of frames;
   extract first section information through the determined continuity of the tag based on the video information, wherein the first section information corresponds to a group of tags having continuity over a first threshold time;
   extract second section information corresponding to tags of the group having a relatively high confidence index over a second threshold time within the first threshold time, wherein a cut is set to correspond to a section having a highest average confidence index over the second threshold time; and
   search the video DB for the video information including a tag matching the video search condition.

10. The apparatus of claim 9, wherein:
    the at least one object is recognized in the frames of each of the plurality of video files using an artificial intelligence model trained through supervised learning; and
    the artificial intelligence model is initially trained using an initial training data set and is further trained using on-device learning using the video corresponding to personal data of a user.

11. The apparatus of claim 9, wherein the one or more processors is further configured to detect the video information by:
    searching the video DB for the video information based on the received video search condition;
    searching for a tag associated with the object recognized in the video, and detecting the section information of the tag, based on the video search condition.

12. The apparatus of claim 11, further comprising a microphone configured to receive voice input, wherein receiving the video search condition comprises receiving a voice input comprising at least recording time information, a tag about a recording position, or a tag related to an appearing object, wherein the one or more processors is further configured to recognize a logical relationship between a plurality of search conditions through speech recognition.

13. The apparatus of claim 9, further comprising a display, wherein the one or more processors is further configured to control the display to display a playlist for playing a section in which the recognized object appears based on detection of the video information.

14. The apparatus of claim 9, further comprising a display, wherein the one or more processors is further configured to control the display to display a thumbnail displayed as a start frame of a section having the relatively high confidence index of a tag among continuous tags, and a timestamp of the start frame.

15. The apparatus of claim 9, further comprising a display, wherein the one or more processors is further configured to control the display to play a highlight comprising one or more appearance sections of at least one video in which objects related to at least one tag appear, and to display identification information of a corresponding video when each of the one or more appearance sections is played.

16. The apparatus of claim 9, wherein the received video information comprises at least video identification information, a tag given to the object, or a confidence index.

\* \* \* \* \*